US011436905B2

(12) United States Patent
Rodriguez

(10) Patent No.: US 11,436,905 B2
(45) Date of Patent: Sep. 6, 2022

(54) SOCKET FIRE ALARM SYSTEM

(71) Applicant: Carrier Corporation, Palm Beach Gardens, FL (US)

(72) Inventor: Jairo Munoz Rodriguez, Barcelona (ES)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/108,799

(22) Filed: Dec. 1, 2020

(65) Prior Publication Data

US 2021/0166539 A1 Jun. 3, 2021

(30) Foreign Application Priority Data

Dec. 2, 2019 (EP) .................................... 19383069

(51) Int. Cl.
*G08B 17/06* (2006.01)
*G01K 1/024* (2021.01)
*G01K 3/00* (2006.01)

(52) U.S. Cl.
CPC ............. *G08B 17/06* (2013.01); *G01K 1/024* (2013.01); *G01K 3/005* (2013.01)

(58) Field of Classification Search
CPC ...... G08B 17/06; G08B 21/185; G01K 1/024; G01K 3/005
See application file for complete search history.

(56) References Cited

U.S. PATENT DOCUMENTS

| 3,320,601 | A | 5/1967 | Yankus |
| 3,522,595 | A | 8/1970 | White |
| 2001/0046815 | A1 | 11/2001 | Luu |
| 2007/0194180 | A1 | 8/2007 | Korcz |
| 2008/0084216 | A1 | 4/2008 | Sanderford et al. |
| 2008/0179067 | A1* | 7/2008 | Ho .......................... A62C 37/40 169/60 |
| 2010/0073839 | A1* | 3/2010 | Baxter ................... G08B 17/06 361/103 |
| 2010/0277325 | A1 | 11/2010 | Kopelman |
| 2013/0032594 | A1 | 2/2013 | Smith |
| 2014/0368977 | A1 | 12/2014 | Lenny |
| 2015/0244121 | A1* | 8/2015 | Amelio .................. H01R 24/78 439/620.21 |

(Continued)

FOREIGN PATENT DOCUMENTS

| CN | 105844869 A | 8/2016 |
| CN | 108023210 A | 5/2018 |

(Continued)

OTHER PUBLICATIONS

European Search Report for Application No. 19383069.2; dated May 25, 2020; 6 Pages.

*Primary Examiner* — Brian Wilson
(74) *Attorney, Agent, or Firm* — Cantor Colburn LLP

(57) ABSTRACT

A fire alarm system 1, comprises a socket 2 including at least one electrical conductor 12 for supplying electricity to a component received by the socket 2; a temperature sensor 4 configured to detect a temperature of the electrical conductor 12; and a fire alarm control panel 6 in communication with the temperature sensor 4. The fire alarm control panel 6 is configured to take an action based on the detected temperature of the electrical conductor 12 within the socket 2.

16 Claims, 1 Drawing Sheet

(56) References Cited

U.S. PATENT DOCUMENTS

2016/0276821 A1* 9/2016 Politis ................. H02H 9/02
2018/0050230 A1  2/2018 Toland

FOREIGN PATENT DOCUMENTS

DE  202015008766 U1  2/2016
RO        129253      2/2014
WO   2009039647 A1   4/2009

* cited by examiner

SOCKET FIRE ALARM SYSTEM

FOREIGN PRIORITY

This application claims priority to European Patent Application No. 19383069.2, filed Dec. 2, 2019, and all the benefits accruing therefrom under 35 U.S.C. § 119, the contents of which in its entirety are herein incorporated by reference.

TECHNICAL FIELD OF INVENTION

The present invention relates to a fire alarm system, and to a related method for using a fire alarm system.

BACKGROUND OF THE INVENTION

Fire alarm systems can detect a fire and raise an alarm to warn of the presence of a fire. Fire alarm systems can be activated manually by an operator at a manual call point. Other fire alarm systems can be activated automatically by the detection of fire conditions using sensors such as carbon monoxide sensors, smoke detectors and the like. Automated fire suppression systems such as sprinklers can be provided within the same system.

Electrical fires can occur when an electrical component becomes overheated. This is particularly common when the component is connected to or part of an electrical socket. Overheating of a component connected to a socket or overheating of components within the socket itself can be caused by overuse of the socket, i.e. when an excessive number of electrical components are connected to the same socket. Electrical cables which are below specification can also cause electrical fires, for instance if the cable is too thin for the power used. Excessive temperatures of electrical conductors can cause damage to insulating material, such as electrical insulation of a wire or cable. Damaged insulation can expose the electrical conductor in the cable which poses a fire and electrical shock hazard. Some systems comprise circuit breakers to cut power to a system in response to adverse electrical conditions. However overheated cables and other electrical conductors can catch fire without activating circuit breakers.

There is often a delay between the generation of a fire and the detection of the fire as it takes time for smoke and/or carbon monoxide emitted by the fire to reach the sensor/detector. This delay can allow the fire to propagate and cause damage before the fire can be located and extinguished. Due to the position and configuration of electrical sockets, if a fire occurs in a socket there can be a long delay between the generation of the fire and the detection of the fire.

SUMMARY OF THE INVENTION

Viewed from a first aspect, the present invention provides a fire alarm system comprising: a socket including at least one electrical conductor configured to electrically connect to a component received by the socket; a temperature sensor configured to detect a temperature of the electrical conductor; and a fire alarm control panel in communication with the temperature sensor, wherein the fire alarm control panel is configured to take an action based on the detected temperature of the electrical conductor.

With this fire alarm system advantages are provided in that overheating of an electrical component of a socket can be detected and subsequent action can be taken before a fire has been generated or quickly after a fire has been generated. This increases the likelihood that the fire is prevented from occurring or that the fire can be quickly extinguished, thus reducing the risk of damage to the component, socket, and/or surrounding area. Rather than detecting smoke, carbon monoxide or other by-products of fire, the present fire alarm system can detect the conditions of overheating that may lead to a fire or be caused by a fire, and action can be taken by a fire alarm control panel.

The socket may be configured for supplying electricity to an electrical component received by the socket, for example via a plug. The socket may comprise one or more terminals to receive the component. The socket may comprise a face plate into which the plug of the electrical component is inserted. The face plate may house the one or more terminals. The plug may comprise one or more protrusions or prongs to physically engage with the terminal of the socket. The terminal may be connected to an electrically conductive wire or cable within the socket. The electrically conductive wire may be a live wire, an earth wire, and/or a neutral wire. The wire may comprise a conductive core encased in an electrically insulating material. The wire may be secured in place by one or more terminal screws. The wire may supply electricity to the socket from a power supply external to the socket. The electricity supplied may be AC power. Sockets and corresponding components received by the socket may have different configurations based on the jurisdiction in which they are located.

The socket may comprise one or more electrical conductors. An electrical conductor in a socket is typically a metal, which may permit good transmission of heat. Advantageously, the temperature sensor is configured to detect the temperature of an electrical conductor of the socket, which may permit overheating of the conductor to be detected either indicating the presence of a fire or of dangerous heat levels that could lead to fire. The temperature sensor may be in direct contact with the electrical conductor. The direct contact may be direct thermal contact to enable the temperature sensor to detect the temperature of the electrical conductor more precisely.

The electrical conductor can be any component in the socket which is in electrical contact with a component received by the socket. The electrical contact may be a direct, physical connection or may be an indirect connection via one or more electrically conductive intermediate elements. For example, the electrical conductor may be a terminal of the socket or a conductive core of an electrical cable connected to the socket.

The temperature sensor may comprise any sensor capable of detecting a temperature of the electrical conductor. The temperature sensor may be configured to monitor an in phase and/or a neutral terminal of the socket. The temperature sensor may comprise more than one temperature sensor for redundancy and/or to monitor the temperature of different electrical conductors in the socket.

The temperature sensor may communicate the detected temperature of the electrical conductor to a fire alarm control panel. The communication between the temperature sensor and the fire alarm control panel can be via a wired connection and/or a wireless connection. The communication may be along power transmission lines. This advantageously minimises the number of components in the fire alarm system and aids retrofitting of the fire alarm system into existing systems.

The temperature sensor may output a signal to the fire alarm control panel wherein the signal may be indicative of the detected temperature of the electrical conductor. The fire alarm control panel may be configured to receive the signal from the temperature sensor via an input. The signal may indicate a specific temperature of the electrical conductor or may indicate whether the temperature of the electrical conductor is within a specific range, for example above or below a threshold temperature.

The fire alarm control panel is configured to take an action based on the detected temperature of the electrical conductor. Examples of the action include alerting an operator, activating an alarm, activating a fire prevention measure, activating a fire protection measure, and activating a fire suppression measure. An exemplary fire prevention measure may include preventing power to the socket or a section of an electric power system which includes the socket. Alerting an operator may comprise sending an alert to a remote device, and/or displaying information on a display of the fire alarm control panel. Activating a fire protection measure may comprise activating smoke extractors and activating a fire barrier, such as a fire door. Activating a fire suppression measure may comprise one or more of: activating a sprinkler system, activating an inert gas system, and activating a powder-based fire suppression system.

It will be understood that the fire alarm control panel is not limited to taking these actions, and any suitable action may be performed based on the detected temperature of the electrical conductor of the socket.

Alerting the operator may include sending an alert an operator of the presence of an overheating socket so that appropriate actions can be taken by the operator to prevent the generation of a fire, for example by switching off power to the socket until the electrical conductor has reached a safe temperature.

The alarm may be any suitable alarm, for example an audible alarm and/or a visual alarm.

The action taken by the fire alarm control panel may include preventing power to a section of an electric power system which includes the socket. The power to the socket may be prevented until the detected temperature is below a threshold temperature. The action may include sending an alert to a remote device. The remote device may be a mobile device. The alert may indicate the location and/or severity of the detected temperature of the electrical conductor of the socket. The alert may prompt an operator of the remote device to take an action, for example to remove a component connected to the socket, and/or to switch off power to the socket. Therefore the likelihood of the overheating electrical component causing a fire is reduced.

The fire alarm control panel may be configured to take the action when certain criteria are met. The fire alarm control panel may be configured to take a first action when one or more first criteria are met. The fire alarm control panel may be configured to take a second action when one or more second criteria are met, wherein the second criteria are different from the first criteria. Examples of such criteria include the detected temperature reaching or exceeding a threshold temperature. It may be required for the detected temperature to exceed the threshold temperature for a period of time, which may be a predetermined period of time. The fire alarm control panel may take a first action when the detected temperature exceeds a first threshold for a first period of time and take a second action when the detected temperature exceeds a second threshold for a second period of time. The second threshold may be higher than the first threshold. The second period of time may be shorter than the first period of time. The threshold may be a predetermined threshold and/or a time-variable threshold. The threshold may be at least 100° C. or at least 200° C. Typically, electrical fires can burn at around 800° C. Thus the threshold may be below 800° C., or below 600° C. When the temperature sensor is configured to detect the temperature of more than one electrical conductor in the socket, the fire alarm control panel may take the action based on the detected temperature of any of the electrical conductors.

The fire alarm system may comprise multiple sockets and multiple temperature sensors in communication with the fire alarm control panel. Each of the temperature sensors may be configured to detect a temperature of an electrical conductor of one of the multiple sockets. For example, the fire alarm system may comprise a second socket and a second temperature sensor in communication with the fire alarm control panel. The second temperature sensor may be configured to detect a temperature of an electrical conductor of the second socket. Optionally, further such sockets may be present.

The fire alarm control panel may be in communication with each of the at least two sockets. The sockets may be connected in series. The fire alarm control panel may be configured to determine which of the sockets has detected an overheated electrical conductor. The fire alarm control panel may be further configured to provide an indication of which of the sockets has detected the overheated electrical conductor, for example by displaying a location of the overheated socket on a display.

Viewed from a second aspect, the present invention provides a method of use of a fire alarm system. The fire alarm system may include any of the features as discussed above, optionally including any one or more or all of the optional features described.

The method may include detecting a temperature of an electrical conductor for supplying electricity to a component received by a socket; and taking an action by a fire alarm control panel based on the detected temperature of the electrical conductor.

The method may comprise receiving a signal at the fire alarm control panel, the signal being indicative of the detected temperature of the electrical conductor.

The action may be taken when the detected temperature exceeds a threshold temperature for a period of time. The action may include at least one of: activating an alarm, preventing power to a section of an electric power system which includes the socket, sending an alert to a remote device, and displaying information on a display of the fire alarm control panel.

Detecting the temperature of the electrical conductor may include directly contacting the electrical conductor with a temperature sensor. The electrical conductor may be a socket terminal or a conductive core of an electrical cable.

The method may include detecting a temperature of a second electrical conductor for supplying electricity to a component received by a second socket, and taking an action by a fire alarm control panel based on the detected temperature of the component of the first and/or second socket.

BRIEF DESCRIPTION OF THE DRAWINGS

Certain preferred embodiments of the present invention will now be described, by way of example only, with reference to the following drawings, in which.

DETAILED DESCRIPTION

Figure 1:
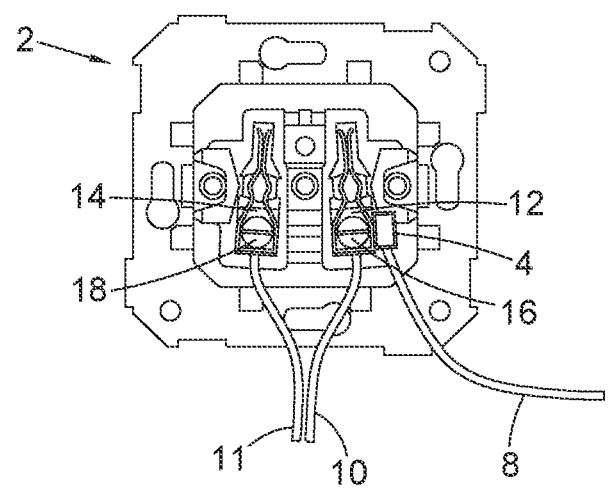
FIG. 1 is a diagram of a socket including a temperature sensor.

FIG. 1 shows the internal arrangement of a socket 2 for supplying electricity. The socket 2 comprises a temperature sensor 4 that is in communication with a fire alarm control panel 6 via a communication means 8.

The socket 2 includes a first terminal 12 and a second terminal 14. The socket 12 is configured to receive a plug 26. The first and second terminals 12, 14 are configured to directly contact first and second pins of the plug 26, respectively, when the plug 26 is engaged with the socket 2, so as to supply electrical power to the plug 26.

First and second terminal screws 16, 18 are provided to secure first and second electrical wires 10, 11 to the first and second terminals 12, 14 respectively. The electrical wires 10, 11 are in electrical contact with the first and second terminals 12, 14. The electrical wires 10, 11 supply electricity to the terminals 12, 14 of the socket 2.

The temperature sensor 4, in this example, is configured to detect the temperature of the first terminal 12. The temperature sensor 4 is in direct contact with the first terminal 12. The temperature sensor 4 is configured to send a signal to the fire alarm control panel 6 via communication means 8, the signal being indicative of the temperature of the first terminal 12.

The first terminal 12 is an electrical conductor. The second terminal 14 is also an electrical conductor. Whilst the illustrated embodiment includes a temperature sensor 4 configured to monitor a temperature of the first terminal 12, the temperature sensor 4 may instead be configured to monitor a temperature of the second terminal 14 or a temperature of the electrically conductive core of either of the first and second electrical wires 10, 11. In a further exemplary embodiment, multiple temperature sensors may be provided within the socket 2 for monitoring any two or more or all of these temperatures.

Figure 2:
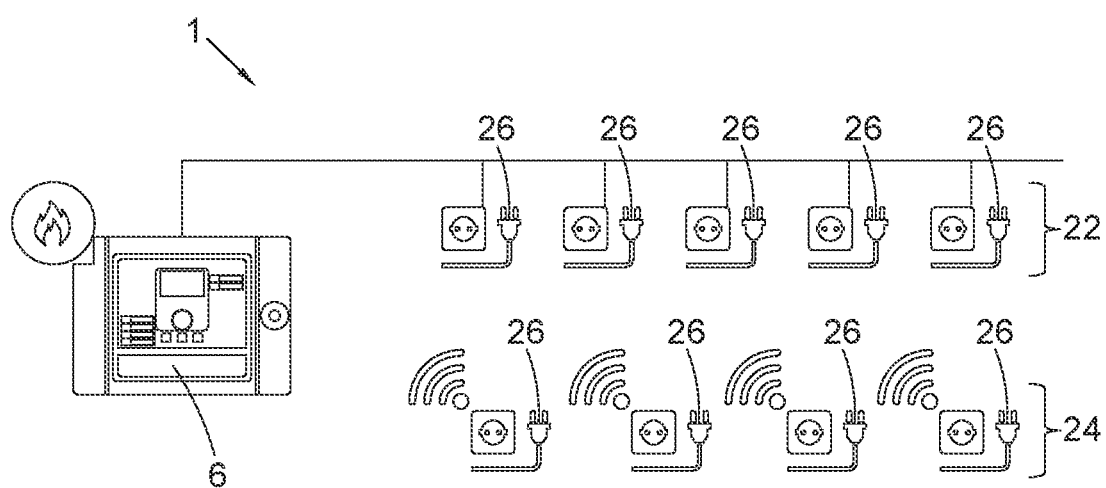
FIG. 2 is a diagram of a fire alarm system illustrating a plurality of such sockets in communication with the fire control panel.

FIG. 2 shows a fire alarm system 1 comprising a plurality of first sockets 22, and a plurality of second sockets 24, each being in communication with a fire alarm control panel 6.

Each of the plurality of first sockets 22 has a structure as described above and with reference to FIG. 1. Each of the plurality of second sockets 24 has a structure similar to that of the socket 2 described above and with reference to FIG. 1, except that each of the plurality of second sockets 24 is configured to use wireless communication instead of wired communication.

In alternative embodiments, the fire alarm system 1 may include only the first sockets 22, i.e. utilising only wired communication, or only the second sockets 24, i.e. utilising only wireless communication. Other forms of communication, such as power-line communication, may additionally or alternatively be employed between one or more of the sockets 22, 24 and the fire alarm control panel 6.

Each of the sockets 22, 24 includes a respective temperature sensor (not shown) configured to detect a temperature of one or more electrical conductor in the respective socket 22, 24. Each socket 22, 24 is configured to communicate the detected temperature of the respective electrical conductor to the fire alarm control panel 6.

Electrically conductive components within a socket 22, 24 are typically also thermally conductive. Thus, in the event of overheating or fire caused by an electrical component connected to a socket 22, 24, the heat will be transmitted via the cable and plug 26 of the electrical component to the electrical conductors within the socket 22, 24.

Many existing fire alarm systems can only detect fires and socket overheating when sufficient smoke or other fire conditions have been generated for a detector to be activated. By directly monitoring the temperatures of these conductive components within the socket 22, 24, it is possible to provide early warning of a potential fire and/or early detection of an actual fire.

The fire alarm control panel 6 is configured to take one or more action based on the detected temperature of any one or more of the sockets 22, 24. Those actions may, for example, include alerting an operator of the fire alarm system 1, activating an alarm, activating one or more protection measures, and activating one or more fire suppression measures.

In various embodiments, the fire alarm control panel 6 may employ multiple criteria for triggering actions. The fire alarm control panel 6 may utilise two different criteria for triggering the same or similar actions. The criteria may be predetermined criteria, for example set during installation or manufacture of the fire alarm system 1, or may be dynamic criteria that can be adjusted responsive to other conditions within the system 1.

A first exemplary criterion for triggering a first action may comprise a temperature exceeding a first temperature threshold. The first temperature threshold may be set to a relatively low temperature, but still above normal operating temperatures of a socket 22, 24, for example at a temperature of at least 60° C., but typically below 100° C. The first action may comprise alerting an operator of the fire alarm system 1, where the alert may indicate an over-temperature situation in a particular socket 22, 24. The alert may be, for example, a visual or audible alert, but not a general alarm. This may indicate to the operator that the socket 22, 24 should be investigated for incorrect usage, but that there is not an immediate risk.

A second exemplary criterion for triggering a second action may comprise a temperature exceeding a second temperature threshold, optionally for a first period of time. For example, the second temperature threshold may comprise a temperature indicative of imminent fire, for example the threshold may be set at a temperature of at least 80° C. The second action may in some embodiments only be triggered if the temperature has exceeded the second threshold for a first period of time, so as to prevent spurious temperature readings or transient temperature rises from triggering the action.

The second action may be a further alert to the operator, or may comprise one or more preventative measures, such as preventing power to the socket 22, 24 or to a section of an electric power system which includes the socket 22, 24.

A third exemplary criterion for triggering a third action may comprise a temperature exceeding a third temperature threshold, optionally for a second period of time. For example, the third temperature threshold may comprise a temperature indicative of actual fire, and the second temperature threshold may be a temperature above 120° C. As above, the action may in some embodiments only be triggered if the temperature is exceeded for a second period of time, so as to prevent spurious temperature readings or transient temperature rises from triggering the action. However, the second period of time is preferably shorter than the first period of time, due to the increased likelihood of a fire.

The third action may comprise activating one or more preventative measures, such as preventing power to the socket 22, 24 or a section of an electric power system which includes the socket 22, 24. The third action may comprise one or more protective measures, such as activating a fire suppression system (not shown), for example by activating sprinklers, activating fire barriers, and the like. The third action may comprise activating an alarm of the fire alarm system 1, including audible and/or visual alarms.

The above criteria and corresponding actions are merely exemplary, and the fire alarm system 1 may utilise only some of these. Furthermore, the fire alarm system 1 may include further criteria for taking any of the above actions, or for taking further actions.

What is claimed is:

1. A fire alarm system, comprising:
   a socket including at least one electrical conductor configured to electrically connect to a component received by the socket;
   a temperature sensor configured to detect a temperature of the electrical conductor; and
   a fire alarm control panel in communication with the temperature sensor,
   wherein the fire alarm control panel is configured to take a first action when the detected temperature of the electrical conductor exceeds a first threshold for a first period of time; and
   wherein the fire alarm control panel is configured to take a second action when the detected temperature of the electrical conductor exceeds a second threshold for a second period of time, the second threshold being higher than the first threshold.

2. The fire alarm system as claimed in claim 1, wherein the temperature sensor is configured to output a signal to the fire alarm control panel, the signal being indicative of the detected temperature of the electrical conductor.

3. The fire alarm system as claimed in claim 1, wherein at least one of the first action and the second action includes at least one of: activating an alarm, preventing power to a section of an electric power system which includes the socket, sending an alert to a remote device, and displaying information on a display of the fire alarm control panel.

4. The fire alarm system as claimed in claim 3, wherein the action includes displaying information on a display of the fire alarm control panel.

5. The fire alarm system as claimed in claim 1, wherein the temperature sensor is in direct contact with the electrical conductor.

6. The fire alarm system as claimed in claim 1, wherein the electrical conductor is a terminal of the socket or a conductive core of an electrical cable.

7. The fire alarm system as claimed in claim 1, comprising a second socket including a second temperature sensor in communication with the fire alarm control panel, the second temperature sensor being configured to detect a temperature of an electrical conductor of the second socket, and the fire alarm control panel being configured to take an action based on the detected temperature of the electrical conductor of the second socket.

8. The fire alarm system as claimed in claim 1, wherein the first action comprises alerting an operator of the fire alarm system and wherein the second action comprises preventing power to a section of an electric power system which includes the socket.

9. A method, comprising:
   detecting a temperature of an electrical conductor within a socket, the electrical conductor being in electrical contact with a component received by the socket; and
   taking a first action by a fire alarm control panel when the detected temperature of the electrical conductor exceeds a first threshold for a first period of time; and
   taking a second action by a fire alarm control panel when the detected temperature of the electrical conductor exceeds a second threshold for a second period of time, the second threshold being higher than the first threshold.

10. The method as claimed in claim 9, comprising receiving a signal at the fire alarm control panel, the signal being indicative of the detected temperature of the electrical conductor.

11. The method as claimed in claim 9, wherein at least one of the first action and the second action includes at least one of: activating an alarm, preventing power to a section of an electric power system which includes the socket, sending an alert to a remote device, and displaying information on a display of the fire alarm control panel.

12. The method as claimed in claim 11, wherein the action includes displaying information on a display of the fire alarm control panel.

13. The method as claimed in claim 9, wherein detecting the temperature of the electrical conductor includes detecting the temperature of the electrical conductor using a temperature sensor that is directly contacting the electrical conductor.

14. The method as claimed in claim 9, wherein the electrical conductor is a terminal of the socket or a conductive core of an electrical cable.

15. The method as claimed in claim 9, comprising:
    detecting a temperature of a second electrical conductor within a second socket, the second electrical conductor being in electrical contact with a component received by the second socket; and
    taking an action by the fire alarm control panel based on the detected temperature of the electrical conductor of the second socket.

16. The method as claimed in claim 9, wherein the first action comprises alerting an operator of the fire alarm system and wherein the second action comprises preventing power to a section of an electric power system which includes the socket.

* * * * *